United States Patent
Heidel et al.

(10) Patent No.: US 10,824,519 B2
(45) Date of Patent: Nov. 3, 2020

(54) DATABASE RECOVERY AND OPTIMIZATION WITH BATCH PROCESSING

(71) Applicant: SAP SE, Walldorf (DE)

(72) Inventors: Martin Heidel, Berlin (DE); Xin Liu, Los Angeles, CA (US); Christoph Roterring, Sinsheim (DE); Shiping Chen, San Francisco, CA (US); Vivek Kandiyanallur, San Francisco, CA (US); Stephan Kottler, Baden-Württemberg (DE); Joern Schmidt, Munich (DE)

(73) Assignee: SAP SE, Walldorf (DE)

( * ) Notice: Subject to any disclaimer, the term of this patent is extended or adjusted under 35 U.S.C. 154(b) by 249 days.

(21) Appl. No.: 15/953,856

(22) Filed: Apr. 16, 2018

(65) Prior Publication Data
US 2019/0317865 A1 Oct. 17, 2019

(51) Int. Cl.
*G06F 11/14* (2006.01)
*G06F 16/21* (2019.01)
*G06F 16/22* (2019.01)
*G06F 16/23* (2019.01)
*G06F 16/2455* (2019.01)

(52) U.S. Cl.
CPC ........ *G06F 11/1469* (2013.01); *G06F 16/213* (2019.01); *G06F 16/2282* (2019.01); *G06F 16/2379* (2019.01); *G06F 16/24553* (2019.01); *G06F 2201/84* (2013.01)

(58) Field of Classification Search
USPC .............................................. 707/686, 692
See application file for complete search history.

(56) References Cited

U.S. PATENT DOCUMENTS

| | | | | |
|---|---|---|---|---|
| 5,603,024 A | * | 2/1997 | Goldring | G06F 11/1471 707/615 |
| 5,706,470 A | * | 1/1998 | Okada | G06F 11/1451 707/999.202 |
| 6,519,601 B1 | * | 2/2003 | Bosch | G06Q 50/22 |
| 9,183,200 B1 | * | 11/2015 | Liu | G06F 16/278 |
| 9,460,008 B1 | * | 10/2016 | Leshinsky | G06F 12/0238 |
| 9,594,816 B2 | * | 3/2017 | Bandekar | G06F 16/254 |
| 9,772,911 B2 | * | 9/2017 | Barber | G06F 16/254 |
| 9,928,271 B2 | * | 3/2018 | Agarwal | G06F 11/3409 |
| 10,585,912 B2 | * | 3/2020 | Barmentloo | G06F 16/287 |
| 2012/0023369 A1 | * | 1/2012 | Bourbonnais | G06F 11/1474 714/16 |
| 2012/0150829 A1 | * | 6/2012 | Bourbonnais | G06F 16/273 707/703 |
| 2016/0283331 A1 | * | 9/2016 | Barber | G06F 16/254 |

* cited by examiner

*Primary Examiner* — Cam Linh T Nguyen
(74) *Attorney, Agent, or Firm* — Sterne, Kessler, Goldstein & Fox P.L.L.C.

(57) ABSTRACT

Disclosed herein are system, method, and computer program product embodiments for a database recovery and optimization with batch processing system. An embodiment operates by retrieving a database log that includes a plurality of operations for modifying data of a database stored across a plurality of tables. From the database log, a plurality of consecutive insert operations for inserting data into the database are identified. The consecutive insert operations are sorted by table. The sorted insert operations are grouped into a batch message. The batch message is transmit to the database for replay. An acknowledgement is received that the replay has completed.

20 Claims, 6 Drawing Sheets

DATABASE RECOVERY AND OPTIMIZATION WITH BATCH PROCESSING

CROSS REFERENCE TO RELATED APPLICATIONS

This application is related to co-pending U.S. patent application Ser. No. 15/410,701, by Heidel, et al., "Database Redo Log Optimization by Skipping MVCC Redo Log Records," filed Jan. 19, 2017; and is also related to co-pending U.S. patent application Ser. No. 15/365,396, by Andrei, et al., "Common Runtime and Recovery Framework for Manipulating Data in Main Memory of Database System," filed Nov. 30, 2016; and is also related to co-pending U.S. patent application Ser. No. 15/445,593, by Florendo et al., "Replay of Redo Log Records in Persistency or Main Memory of Database Systems," filed Feb. 28, 2017; and is also related to co-pending U.S. patent application Ser. No. 14,553,833, by Andrei et al., "Efficient database Undo/Redo Logging," filed Nov. 25, 2014; and is also related to U.S. Pat. No. 9,811,549, by Schreter, et al., "Applying Database Transaction Log Record Directly to a Database Table Container," issued Nov. 7, 2017; all of which are hereby incorporated by reference in their entireties.

BACKGROUND

After a database fails, the database must be restored into a consistent state before it can be accessed. For example, at the time of failure there may have been transactions that were in progress that were logged and committed but were not persisted to the database. In such situations, returning the database to a consistent state often requires replaying each transaction, one-at-a-time, from the log. This can be a time-consuming and resource intensive process.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for database recovery and optimization with batch processing according to various embodiments.

Figure 1:
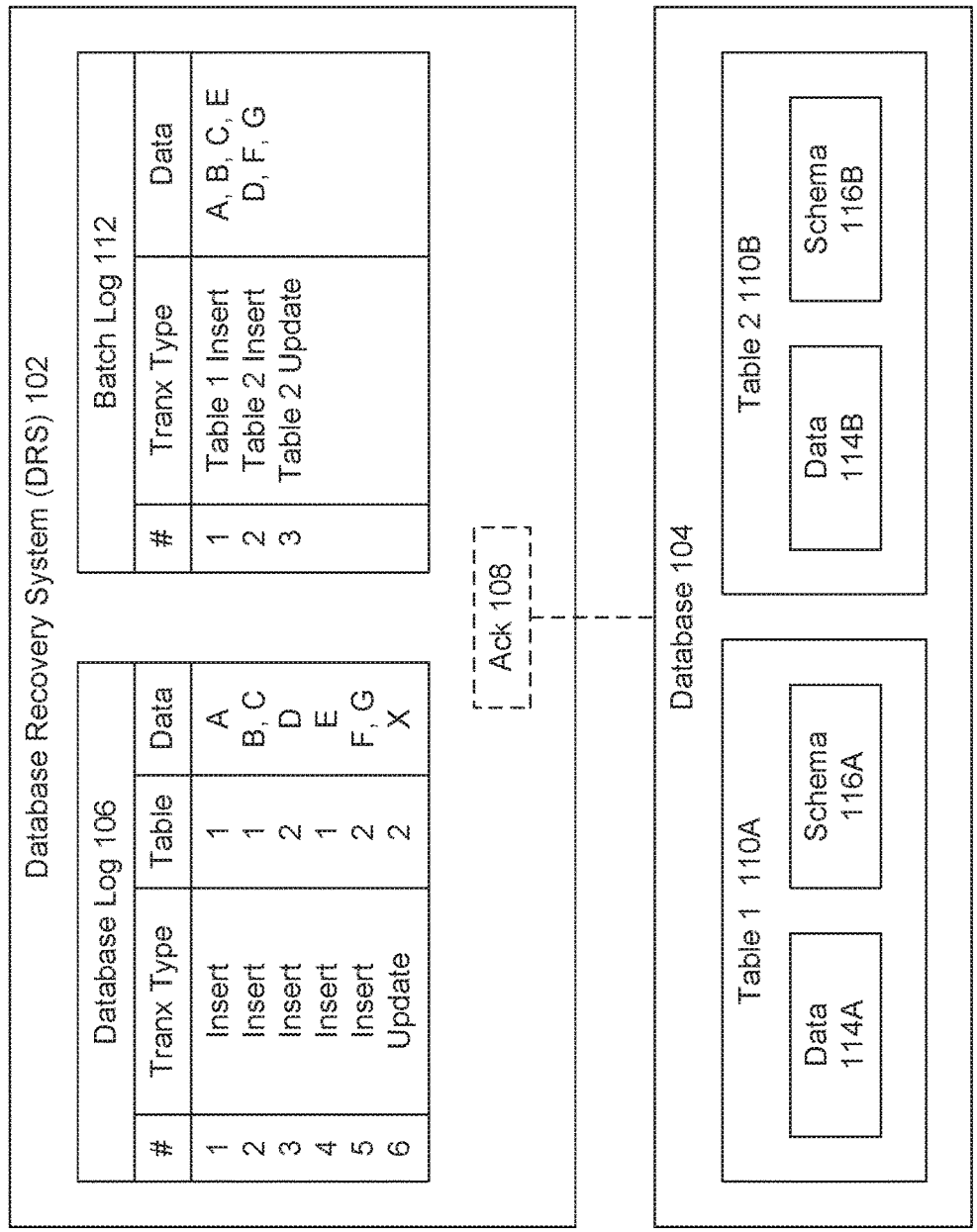
FIG. 1 is a block diagram illustrating a database recovery system (DRS), according to some embodiments.

FIG. 1 is a block diagram 100 illustrating a database recovery system (DRS) 102, according to some embodiments. When a database 104 crashes or is otherwise restarted or rebooted, the database 104 often needs to be restored into or enter a consistent state before it can begin processing read and/or write transactions.

Placing the database 104 into a consistent state may include reading transactions which were written to a database log 106 and that were committed but not yet persisted at the time of failure or reboot, and then either replaying and/or rolling back the logged transactions. However, rather than requiring each of the logged transactions to be replayed or processed one-by-one, which can be a resource intensive and time consuming process, DRS 102 enables batch processing for the replay or redo of the logged transactions from DB log 106. This batch processing the transactions requires less time and computing resources than individual or one-at-a-time transaction processing which may otherwise be performed.

The example DB log 106 shown in FIG. 1 includes six transactions that have been logged. The transactions may each include operations or commands for one or more of the tables 110 of database 104. For example, transactions 1, 2, and 4 are directed to Table 1, while transactions 3, 5, and 6 are directed to Table 2. It is understood that the number and types of transactions described herein are provided only as examples, and that other embodiments may include varying numbers and types of transactions beyond those described herein.

If the transactions of DB log 106 were to be replayed in a one-by-one basis, then the details of transaction 1 may be sent to database 104 for processing. Database 104 may then perform a full disk access for Table 1 to insert data A. And when completed, database 104 may transmit an acknowledgement message back to a transmitting processor. Then this process may be repeated for each of the remaining transactions 2-6, transmitting a transaction and acknowledgement messages back and forth.

Not only does each transaction require its own message to a database for replay in one-by-one processing, but also the database processor must conduct an individual disk (write) access to modify the data 114 or schema 116 which has its own overhead, and then return an acknowledgement when the transaction was successfully replayed or otherwise committed or persisted to the corresponding table 110 of database 104 for which a transmitting processor must wait before sending the next transaction to ensure the transactions are replayed sequentially and to maintain data consistency.

However, rather than requiring one-by-one processing of transactions, DRS 102 enables or performs batch processing of at least some of the transactions of DB log 106. In an embodiment, DRS 102 may generate a batch log 112 from DB log 106, and process grouped or batched transactions of batch log 112. For example, DRS 102 may sort or group the transactions of DB log 106 by transaction types and batch them together for processing. In different embodiments, a transaction type may include different components.

In an embodiment, DRS 102 may separate or group the transactions of DB log 106 by the table to which the transaction is directed. For example, the transactions related to Table 1 may be grouped together while the transactions related to Table 2 are grouped together. In an embodiment, this grouping by table may enable multiple processors to simultaneously process the batched transactions from batch log 112. For example, while a first database server or processor of database 104 processes the transactions of Table 1, a second database server or processor may be simultaneously processing the transactions related to Table 2.

While the transaction processing for any particular table 110 may occur synchronously, the transaction processing between different tables 110A, 110B may occur asynchronously (by the same or different processors). This may improve the speed of processing, and reduce the time necessary for replaying the transactions of DB log 106 as performed by the system of FIG. 1 when compared to the alternative of one-by-one transaction processing.

In an embodiment, the different transactions of DB log 106 may affect or change either the data 114 or schema 116 of a particular table 110 of database 104. For example, the transactions may include either a data manipulation language (DML) transaction that modifies data 114 of a table 110, or a data definition language transaction (DDL) transaction that modifies a schema 116 of a table 110. Example DML transactions may include commands to insert, modify, or delete data. Example DDL transactions may include commands to change a data type, add/delete columns (in a row-oriented database), or add/delete rows (in a column-oriented database).

In an embodiment, DRS 102 may group or batch sets of DML transactions to be processed together. In an embodiment, DRS 102 may identify DDL transactions (which change a table schema 116) within DB log 106, and use the DDL transactions as breakpoints to identify sets of DML transactions that may be batched or processed together. For example, DRS 102 may identify the DML transactions of DB log 106 for table 2 that occur prior to the first DDL transaction, and batch those transactions into a set. In the example shown, transaction 6 may be the first DDL transaction in DB log 106. Because transaction 6 affects table 2, the DML transactions for table 2 prior to transaction 6 may be grouped together for batch processing by DRS 102, which may include transactions 2 and 5. If any DML transactions for Table 2 followed the DDL transaction 6, those subsequent transactions may be grouped together as a different set or batch of transactions.

DML transactions may include insert, delete, and/or modify operations. In an embodiment, DRS 102 may apply batch processing to insert transactions from DB log 106. As such, DRS 102 may group or sort insert transactions (as a particular transaction type) separately from modify or delete transaction types for a particular table 110 of database 104. In an embodiment, modify or delete operations may be processed on a one-by-one basis. In another embodiment, modify or delete operations may be grouped, sorted, or processed together. In an embodiment, DRS 102 may separate a modify operation into an insert and delete operation, and the insert operations may be batched together as described herein.

In the example of FIG. 1, DRS 102 may generate a batch log 112. The example batch log 112 shown may include a grouping 1 of the insert transactions for Table 1, a grouping 2 of the insert operations for Table 2, and a grouping 3 of the DDL update operation for Table 2. As shown, rather than sending three different messages for the replay of transactions 1, 2, and 4 on Table 1 (used DB log 106), DRS 102 may send or transmit a single message corresponding to grouping 1 to a first processor (which may include the information about transactions 1, 2, and 4) from batch log 112. As such, rather than requiring three different messages (each with their own bandwidth and overhead requirements), three different disk accesses by database 104, and waiting for three different acknowledgement messages pertaining to each of the three different transmitted messages, DRS 102 transmits a single message, the disk accesses may be performed together, and DRS 102 only waits for a single acknowledgement message 108 for the message for grouping 1.

Further, DRS 102 may also send a second message corresponding to grouping 2 for the DML insert operations on Table 2. As such, while a first processor of database 104 processes the first grouping message, a second processor may simultaneously and asynchronously process the second grouping message. When an ack 108 for the second message is received, DRS 102 may send a message related to grouping 3 for updating the schema 116B of Table 2. Although the example batch log 112 illustrates primarily insert operations, in other embodiments, batch log 112 may include delete and modify operations as well, which may be batched together or sent individually.

By batching together similar (insert) transactions from DB log 106, DRS 102 reduces the number of messages that must be transmitted back and forth between DRS 102 and database 102. As will be described further with regard to FIGS. 2A and 2B, in the example of FIG. 1, rather than requiring 3 separate disk accesses to updated table 1 (based on transaction 1, 2, and 4), database 104 my process grouping 1 together in a single access, further conserving resources, processing cycles, and processing time.

In an embodiment, batch log 112 may include condensed groupings of the transaction information from DB log 106, which may also save memory or other storage space. These groupings may further require less storage space than if stored separately as shown in DB log 106. For example, batch log 112 may include fewer columns, which take up fewer rows than the information as stored in DB log 106.

Figure 2A:
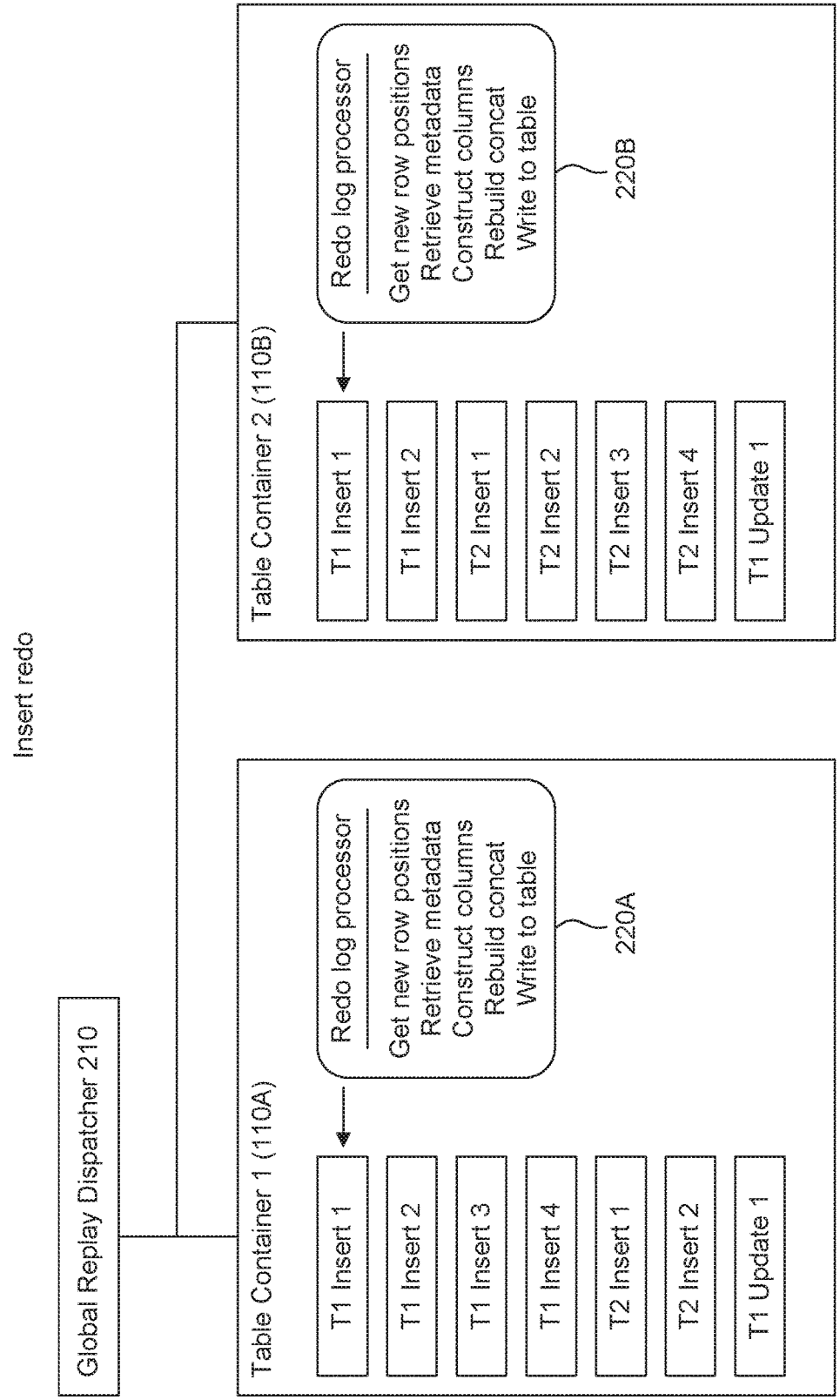
FIG. 2A illustrates an example of one-by-one transaction processing of log data, according to an embodiment.

FIG. 2A illustrates an example 200 of one-by-one transaction processing of log data, according to an embodiment. Global replay dispatcher 210 may be a system or processor that is configured to coordinate or distribute logged transactions for replay or redo by a database. The redo log processor 220 illustrates an example of a processor that receives and/or otherwise processes the received transactions from global replay dispatcher 210. In an embodiment, redo log processor 220 may manage disk storage and commit logged transactions to one or more tables 110. In an embodiment, for a particular insert operation, redo log processor 220A may get new row positions, retrieve metadata, construct columns, rebuild concat, and write to the table. In different embodiments, different functional overhead may be required for each insert operation.

Redo log processor 220A may process or replay the transactions from a first DB log 106, while redo log processor 220B may process or replay the transactions from a second DB log 106. As shown in the example of FIG. 2A, both redo log processors 220A and 220B only operate on the first transaction that has been received. Upon completion of the first transaction processing, the redo log processors 220A, 220B may return acknowledgement messages and then process their respective second transactions, incurring the same functional overhead again for the second transaction.

Figure 2B:
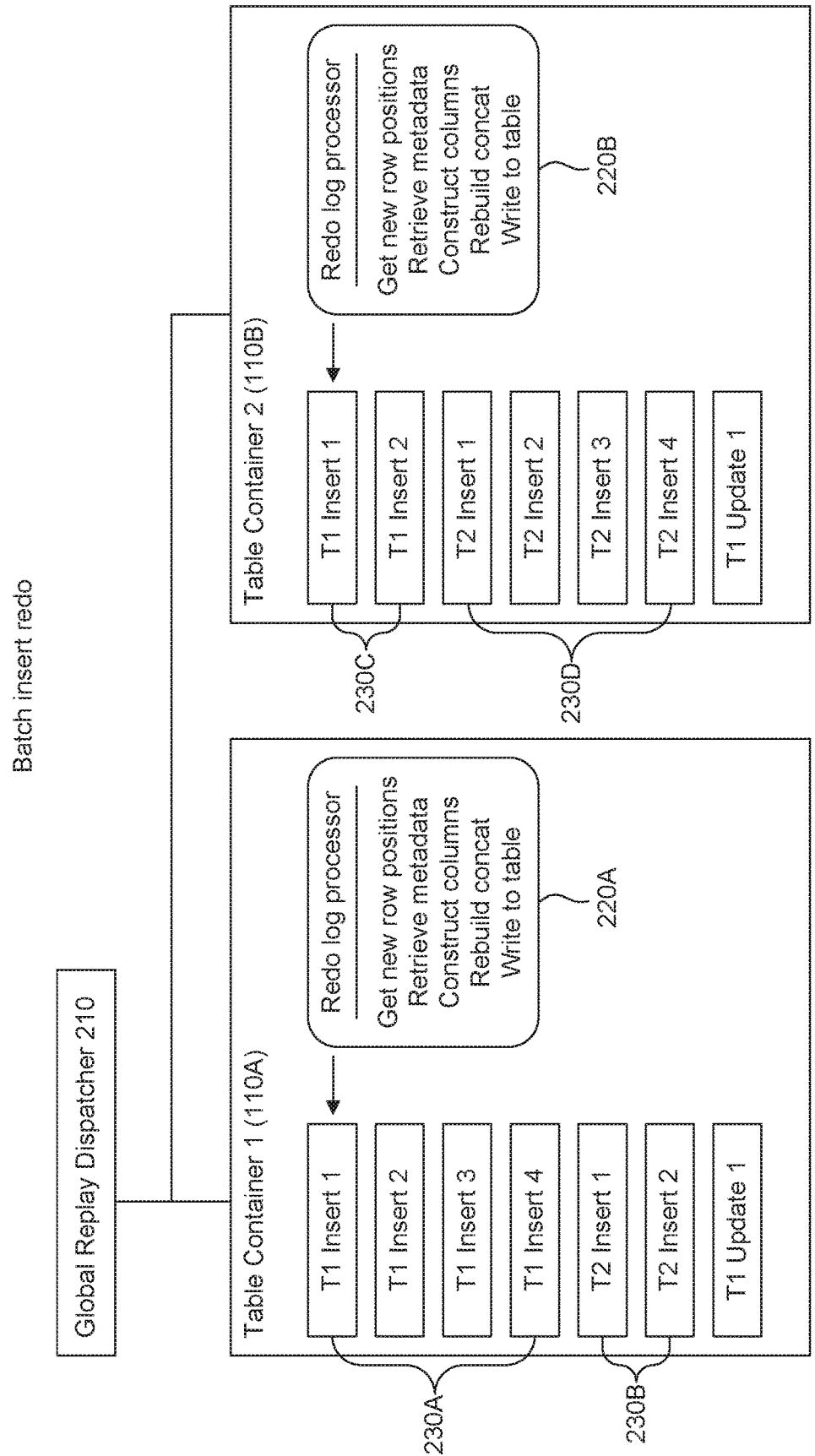
FIG. 2B illustrates an example of batch processing of batched log data by DRS, according to an embodiment.

FIG. 2B illustrates an example 201 of batch processing of batched log data by DRS 102, according to an embodiment. For example, DRS 102 may reorder, batch, sort, or group the transactions that are to be processed by redo log processors 220A, 220B by table. For example, batches 230A and 230C may include groups of insert transactions for table 1, and batches 230B and 230D may include groups of insert transactions for table 2. Then, for example, redo log processors 220A and 220B may then process the transactions for each batch of transactions, rather than for individual transactions.

This batch processing may reduce the amount of processing resources and processing time necessary to process the transactions. For example, rather than incurring the overhead involved in getting new row positions, retrieving metadata, constructing columns, rebuild concat, and writing to the table, for each transaction, redo log processors 220A and 220B may perform each of these steps for a group or batch of several transactions.

Figure 3:
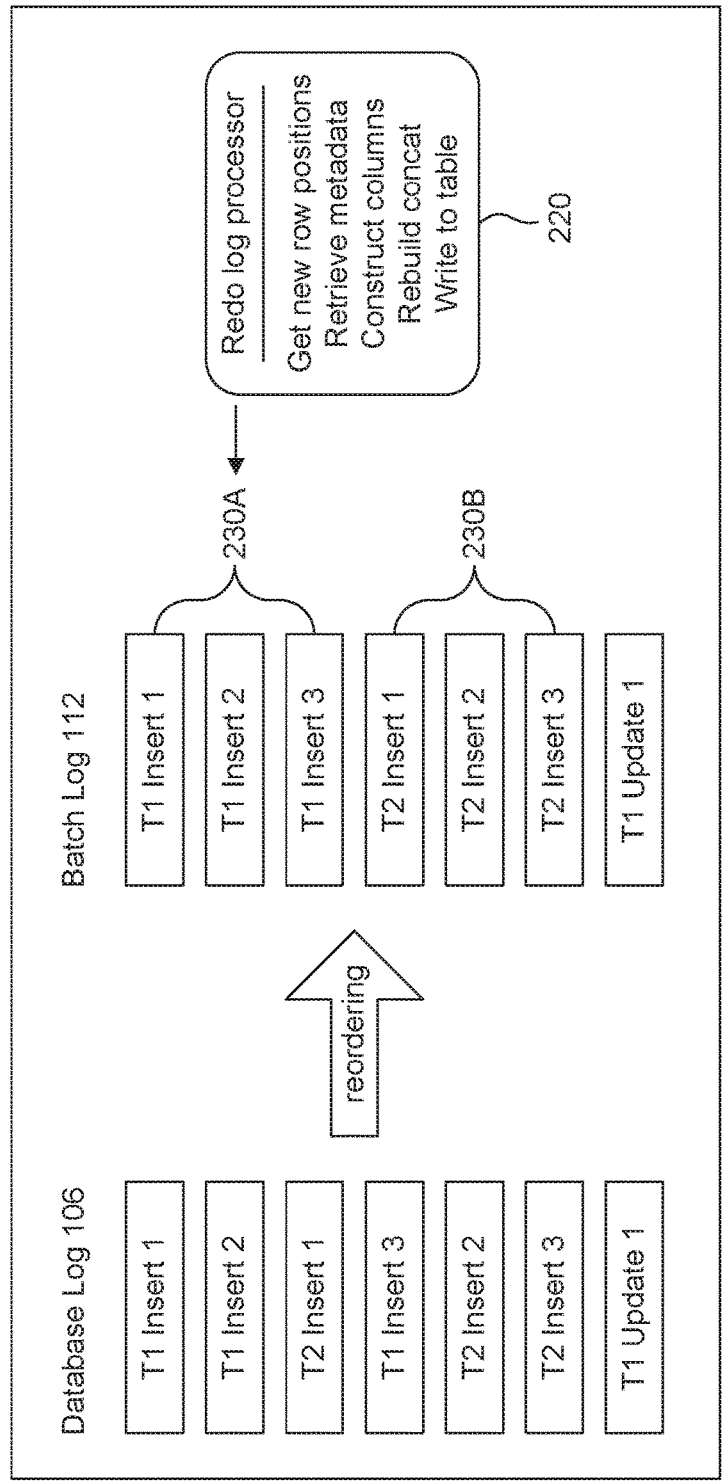
FIG. 3 illustrates an example operation related to database recovery and optimization with batch processing, according to an embodiment.

FIG. 3. Illustrates an example operation 300 related to database recovery and optimization with batch processing, according to an embodiment. In the example shown, DRS 102 may reorder the transactions from a database log 106 and generate a batch log 112, with different batches of transactions 230A, 230, that are then processed by redo log processor 220 of one or more database 104 processors.

In an embodiment, batch log 112 and database log 106 may be the same file or set of memory blocks. For example, batch log 112 may include the same transactions as database log 106 that are reordered as shown. In an embodiment, the transactions of particular batches 230 may be flagged or otherwise indicated. In other embodiments, batch log 112 may be a new file or set of memory blocks that include the batched transaction sets 230, as shown.

Figure 4:
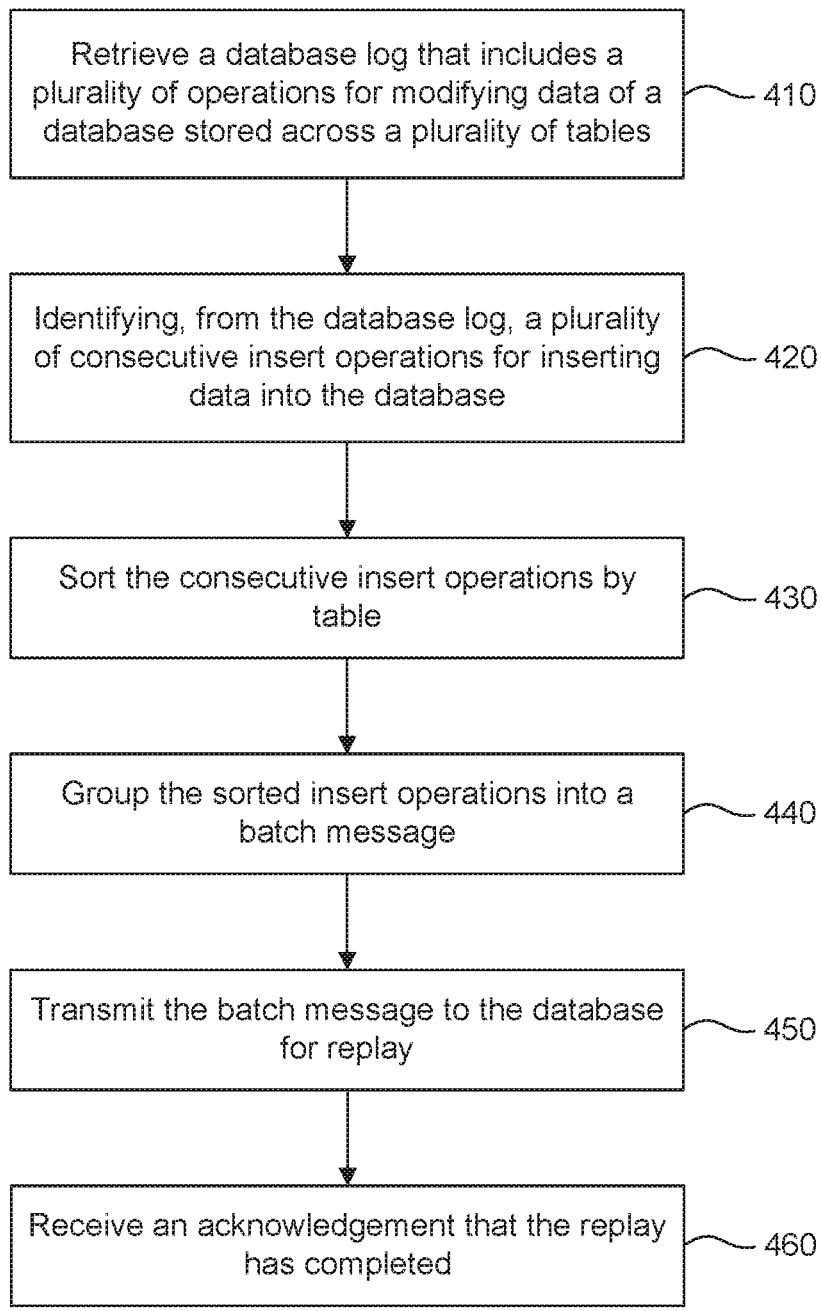
FIG. 4 is a flowchart illustrating example operations of a database recovery system with batch processing, according to some embodiments.

FIG. 4 is a flowchart 400 illustrating example operations of a database recovery system with batch processing, according to some embodiments. Method 400 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 4, as will be understood by a person of ordinary skill in the art. Method 400 shall be described with reference to FIGS. 1-3. However, method 400 is not limited to the example embodiments.

In 410, a database log that includes a plurality of operations for modifying data of a database stored across a plurality of tables is retrieved. For example, upon a system boot after a crash or system reboot, DRS 102 may retrieve or request a DB log 106. DB log 106 may include different transactions that may have been processed before a database 104 restart or crash, but were not yet persisted or committed to non-volatile or disk storage (e.g., by one or more database servers or processors). The transactions may each modify data 114A, 114B and/or schemas 116A, 116B of tables 110A, 110B.

In 420, a plurality of consecutive insert operations for inserting data into the database are identified from the database log. For example, DRS 102 may sort or scan DB log 106 to identify insert operations for inserting data 114 into tables 110. In an embodiment, the insert operations may be extracted from DB log 106 and placed into a batch log 112. In another embodiment, batch log 112 may include a partial reordering and/or grouping of the transactions of DB log 106.

in an embodiment, the consecutive nature of the insert operations may be defined by DDL transactions within DB log. For example, DB log 106 may include insert, modify, and delete DML transactions, as well as DDL transactions. DRS 102 may identify a set of consecutive insert DML transactions in that there are no intervening DDL transactions example, transaction 1 in DB log 106 may be an insert, transaction 2 may be a delete, transaction 3 may be an insert, transaction 4 may be a modify, transaction 5 may be an insert, transaction 6 may be DDL operation, and transaction 7 may be an insert.

in an embodiment, DRS 102 may group transactions 1, 3 and 5 as consecutive insert transactions. However, transaction 7, which comes after the DDL transaction 6, may be part of a second batch or set of insert transactions. If however, The DDL, operation transaction 6 was directed to a different table than the remaining transactions 1-5 and 7, then DRS 102 may group or batch transactions 1, 3, 5, and 7 in a single batch or group. In another embodiment, DRS 102 may not be able to group or batch any of the insert operations in the example together, because each is separated by another non-insert operation.

in 430, the consecutive insert operations are sorted by table. For example, as shown in FIG. 3, the transactions of DB log 106 may be reordered by table into batch log 112. For example, batch 230A includes Table 1 inserts, while batch 230B includes Table 2 inserts.

In 440, the sorted insert operations are grouped into a batch message. For example, as shown in the example of FIG. 3, the transactions of batch log 112 may be grouped into two batch messages 230A and 230B. Also, as shown in the example of FIG. 1, transactions 1-6 of DB log 106 may be grouped into batches 1-3 in batch log 112.

In 450, the batch message is transmitted to the database for replay. For example, as shown in the example of FIG. 2B, global replay dispatcher 210 may transmit batch 230A for processing by redo log processor 220A and batch 230C for replay by redo log processor 220B. In an embodiment, redo log processors 220A and 220B may be operating simultaneously on different batch messages 230. And rather than incurring disk access overhead for each insert transaction, redo log processors 220 may incur disk access overhead for a group of batched insert transactions.

In 460, an acknowledgement that the replay has completed is received. For example, as shown in FIG. 1, DRS 102 may receive an ack message 108 indicating that database 104 has completed processing (e.g., persisting) the transactions of a particular batch message (which may include one or more transactions). In an embodiment, DRS 102 may then transmit a subsequent or queued batch message to the processor.

Figure 5:
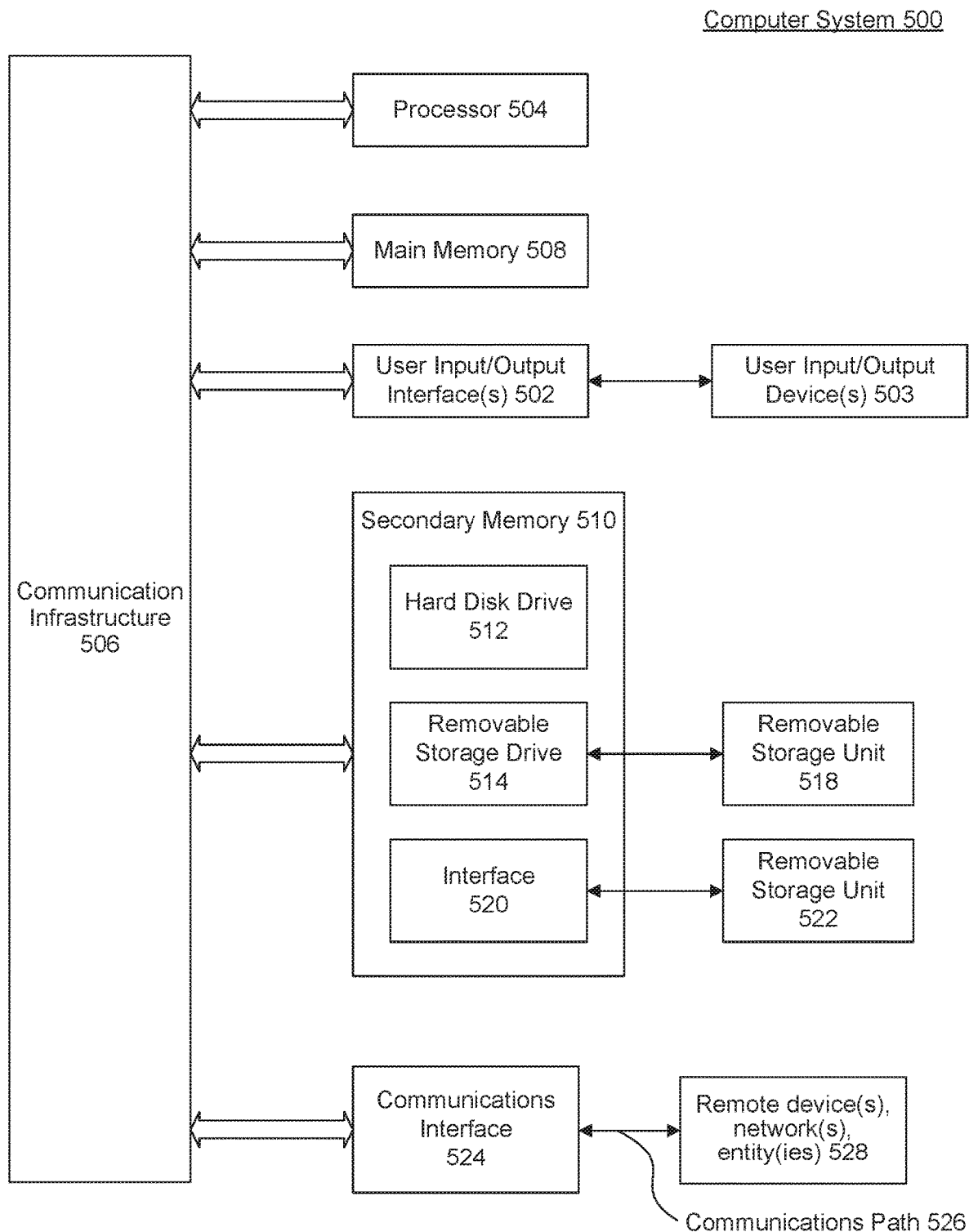
FIG. 5 is an example computer system useful for implementing various embodiments.

Various embodiments may be implemented, for example, using one or more well-known computer systems, such as computer system 500 shown in FIG. 5. One or more computer systems 500 may be used, for example, to implement any of the embodiments discussed herein, as well as combinations and sub-combinations thereof.

Computer system 500 may include one or more processors (also called central processing units, or CPUs), such as a processor 504. Processor 504 may be connected to a communication infrastructure or bus 506.

Computer system 500 may also include user input/output device(s) 503, such as monitors, keyboards, pointing devices, etc., which may communicate with communication infrastructure 506 through user input/output interface(s) 502.

One or more of processors 504 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 500 may also include a main or primary memory 508, such as random access memory (RAM). Main memory 508 may include one or more levels of cache. Main memory 508 may have stored therein control logic (i.e., computer software) and/or data.

Computer system 500 may also include one or more secondary storage devices or memory 510. Secondary memory 510 may include, for example, a hard disk drive 512 and/or a removable storage device or drive 514. Removable storage drive 514 may be a floppy disk drive, a magnetic tape drive, a compact disk drive, an optical storage device, tape backup device, and/or any other storage device/drive.

Removable storage drive 514 may interact with a removable storage unit 518. Removable storage unit 518 may include a computer usable or readable storage device having stored thereon computer software (control logic) and/or data. Removable storage unit 518 may be a floppy disk, magnetic tape, compact disk, DVD, optical storage disk, and/ any other computer data storage device. Removable storage drive 514 may read from and/or write to removable storage unit 518.

Secondary memory 510 may include other means, devices, components, instrumentalities or other approaches for allowing computer programs and/or other instructions and/or data to be accessed by computer system 500. Such means, devices, components, instrumentalities or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 500 may further include a communication or network interface 524. Communication interface 524 may enable computer system 500 to communicate and interact with any combination of external devices, external networks, external entities, etc. (individually and collectively referenced by reference number 528). For example, communication interface 524 may allow computer system 500 to communicate with external or remote devices 528 over communications path 526, which may be wired and/or wireless (or a combination thereof), and which may include any combination of LANs, WANs, the Internet, etc. Control logic and/or data may be transmitted to and from computer system 500 via communication path 526.

Computer system 500 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 500 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 500 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 5. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer-implemented method, comprising:
    retrieving a database log that includes a plurality of operations that modified either data or schema across a plurality of tables of a database and that were executed but not persisted prior to the retrieving;
    sorting the consecutive insert operations into a plurality of groups of operations by both an operation type and the table of the database on which a particular operation was performed, wherein the log includes a plurality of different types of operation, and each group is executable in parallel on the database;
    transmitting a batch message including the plurality of groups of operations to the database for replay of the sorted operations based on the groups; and
    receiving an acknowledgement that the replay has completed.

2. The method of claim 1, wherein the types of operations include both insert and non-insert operations, and wherein the sorting sorts the insert operations prior to the non-insert operations.

3. The method of claim 2, wherein the non-insert operations comprise delete operations.

4. The method of claim 1, wherein at least one of the plurality of operations comprises a schema change operation, wherein a schema of one of the plurality of tables is modified by the schema change operation.

5. The method of claim 4, further comprising:
    transmitting the schema change operation;
    receiving an acknowledgement that the schema change operation has completed;
    grouping one or more insert operations subsequent to the schema change operation into a second batch message; and
    transmitting the second batch message.

6. The method of claim 1, wherein the grouping comprises combining a column of a first insert operation with a column of a second insert operation.

7. The method of claim 1, wherein the retrieving comprises:
    determining that a database failure event associated with the database has occurred, wherein the database log comprises operations that were not persisted to the database prior to the failure event.

8. The method of claim 1, wherein the grouping comprises:
    grouping a first portion of the sorted insert operations into a first batch message corresponding to a first one of the plurality of tables; and
    grouping a second portion of the sorted insert operations into a second batch message corresponding to a second one of the plurality of tables.

9. The method of claim 8, wherein the receiving comprises:
    receiving a second acknowledgement that the second batch message was processed by a second processor prior to receiving a first acknowledgement that the first batch message was processed by a first processor.

10. A system, comprising:
    a memory; and
    at least one processor coupled to the memory and configured to:
        retrieve a database log that includes a plurality of operations that modified either data or schema across a plurality of tables of a database and that were executed but not persisted prior to the retrieving for modifying data of a database stored across a plurality of tables;
        sort the consecutive insert operations into a plurality of groups of operations by both an operation type and the table of the database on which a particular operation was performed, wherein the log includes a plurality of different types of operation, and each group is executable in parallel on the database;
        transmit a batch message including the plurality of groups of operations to the database for replay of the sorted operations based on the groups; and
        receive an acknowledgement that the replay has completed.

11. The system of claim 10, wherein the types of operations include both insert and non-insert operations, and wherein the processors sorts the insert operations prior to the non-insert operations.

12. The system of claim 11, wherein the non-insert operations comprise delete operations.

13. The system of claim 10, wherein at least one of the plurality of operations comprises a schema change operation, wherein a schema of one of the plurality of tables is modified by the schema change operation.

14. The system of claim 13, wherein the processor is further configured to:
    transmit the schema change operation;
    receive an acknowledgement that the schema change operation has completed;
    group one or more insert operations subsequent to the schema change operation into a second batch message; and
    transmit the second batch message.

15. The system of claim 10, wherein the grouping comprises combining a column of a first insert operation with a column of a second insert operation.

16. The system of claim 10, wherein the processor that retrieves is configured to:
    determine that a database failure event associated with the database has occurred, wherein the database log comprises operations that were not persisted to the database prior to the failure event.

17. The system of claim 10, wherein the processor that groups is configured to:
    group a first portion of the sorted insert operations into a first batch message corresponding to a first one of the plurality of tables; and
    group a second portion of the sorted insert operations into a second batch message corresponding to a second one of the plurality of tables.

18. The system of claim 17, wherein the processor that receives is configured to:

receive a second acknowledgement that the second batch message was processed by a second processor prior to receiving a first acknowledgement that the first batch message was processed by a first processor.

19. A non-transitory computer-readable device having instructions stored thereon that, when executed by at least one computing device, cause the at least one computing device to perform operations comprising:
retrieving a database log that includes a plurality of operations that modified either data or schema across a plurality of tables of a database and that were executed but not persisted prior to the retrieving;
sorting the operations into a plurality of groups of operations by both an operation type and the table of the database on which a particular operation was performed, wherein the log includes a plurality of different types of operation, and each group is executable in parallel on the database;
transmitting a batch message including the plurality of groups of operations to the database for replay of the sorted operations based on the groups; and
receiving an acknowledgement that the replay has completed.

20. The method of claim 1, wherein the retrieving is performed subsequent to a crash or reboot operation of one or more devices associated with the database.

* * * * *